(12) United States Patent
Szeremeta

(10) Patent No.: US 8,064,194 B2
(45) Date of Patent: Nov. 22, 2011

(54) MECHANICALLY DECOUPLED STATUS LENS

(75) Inventor: Wally Szeremeta, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 168 days.

(21) Appl. No.: 12/485,866

(22) Filed: Jun. 16, 2009

(65) Prior Publication Data

US 2010/0315923 A1 Dec. 16, 2010

(51) Int. Cl.
*G06F 1/16* (2006.01)

(52) U.S. Cl. .................. 361/679.33; 710/300; 455/566; 369/53.1

(58) Field of Classification Search .................. 710/300; 709/205; 369/53.1; 455/425, 566, 556.1; 361/679.32, 679.33, 679.34, 679.35, 679.36, 361/679.37, 679.52
See application file for complete search history.

(56) References Cited

U.S. PATENT DOCUMENTS

| | | | |
|---|---|---|---|
| 4,484,469 A | 11/1984 | Grover et al. | |
| 5,265,177 A | 11/1993 | Cho et al. | |
| 5,550,944 A | 8/1996 | van Woesik et al. | |
| 5,654,846 A | 8/1997 | Wicks et al. | |
| 5,654,873 A | 8/1997 | Smithson et al. | |
| 5,764,481 A | 6/1998 | Ruch et al. | |
| 6,064,569 A | 5/2000 | Sands et al. | |
| 6,231,224 B1 | 5/2001 | Gamble et al. | |
| 6,431,718 B1 | 8/2002 | Gamble et al. | |
| 6,608,750 B2 | 8/2003 | Cruz et al. | |
| 6,773,125 B2 | 8/2004 | Chen | |
| 6,970,352 B2 * | 11/2005 | Record et al. | 361/679.32 |
| 7,111,973 B2 | 9/2006 | Liu | |
| 7,431,487 B2 | 10/2008 | Burca | |
| 2002/0093788 A1 | 7/2002 | Rothschild | |
| 2004/0257760 A1 | 12/2004 | Record et al. | |
| 2006/0114758 A1 | 6/2006 | Jones et al. | |
| 2007/0233781 A1 * | 10/2007 | Starr et al. | 709/203 |
| 2008/0130219 A1 | 6/2008 | Rabinovitz | |
| 2008/0288697 A1 * | 11/2008 | Kim | 710/300 |

OTHER PUBLICATIONS

Web pages downloaded from Industrial Fiber Optics website on Jun. 16, 2009, http://www.i-fiberoptics.com/light-pipe-connector.php.

* cited by examiner

*Primary Examiner* — Hung Duong

(57) ABSTRACT

A disk drive includes a light source configured to emit light indicative of a disk drive status. A disk drive status light guide system for a disk drive also includes a first light pipe configured and dimensioned to mechanically couple to the disk drive and configured to directly receive and guide light emitted by the light source, and a second light pipe separate from the first light pipe, the second light pipe configured to receive and guide light from the first light pipe to a status lens visible to a user.

36 Claims, 11 Drawing Sheets

MECHANICALLY DECOUPLED STATUS LENS

BACKGROUND

Both external and internal disk drives are typically associated with at least one disk drive status light, often used to provide an indication of disk drive read/write activity. In some disk drives, an external electrical connector couples the disk drive to a separate disk drive status light incorporated into a computer case or external disk drive case. The disk drive may then drive the status light during operation.

In other disk drives, the disk drive status light is formed integrally with the disk drive, and light emitted by the status light may be guided outside an external case holding the disk drive (e.g., via one or more holes in the external case). Unfortunately, when the disk drive status light is a component of the disk drive, the location of the status light may not be ideal for viewing by a user, due to space and configuration constraints on the disk drive. As a result, relatively complex light guides may be formed between the disk drive status light and a lens visible to the user. Since the lens is typically coupled to an external case of the disk drive, as the disk drive moves relative to the external case, stresses may be introduced into the physical components of the light guide system coupling the disk drive status light to the lens.

There is therefore a need for an improved light guide system between a disk drive status light and a lens.

BRIEF DESCRIPTION OF THE DRAWINGS

FIG. 8A is a front, perspective view of the second light pipe of FIG. 4, according to one illustrated embodiment.

FIG. 8B is a front view of the second light pipe of FIG. 4, according to one illustrated embodiment.

FIG. 8C is a rear, perspective view of the second light pipe of FIG. 4, according to one illustrated embodiment.

FIG. 8D is a rear view of the second light pipe of FIG. 4, according to one illustrated embodiment.

DETAILED DESCRIPTION

Figure 1A:
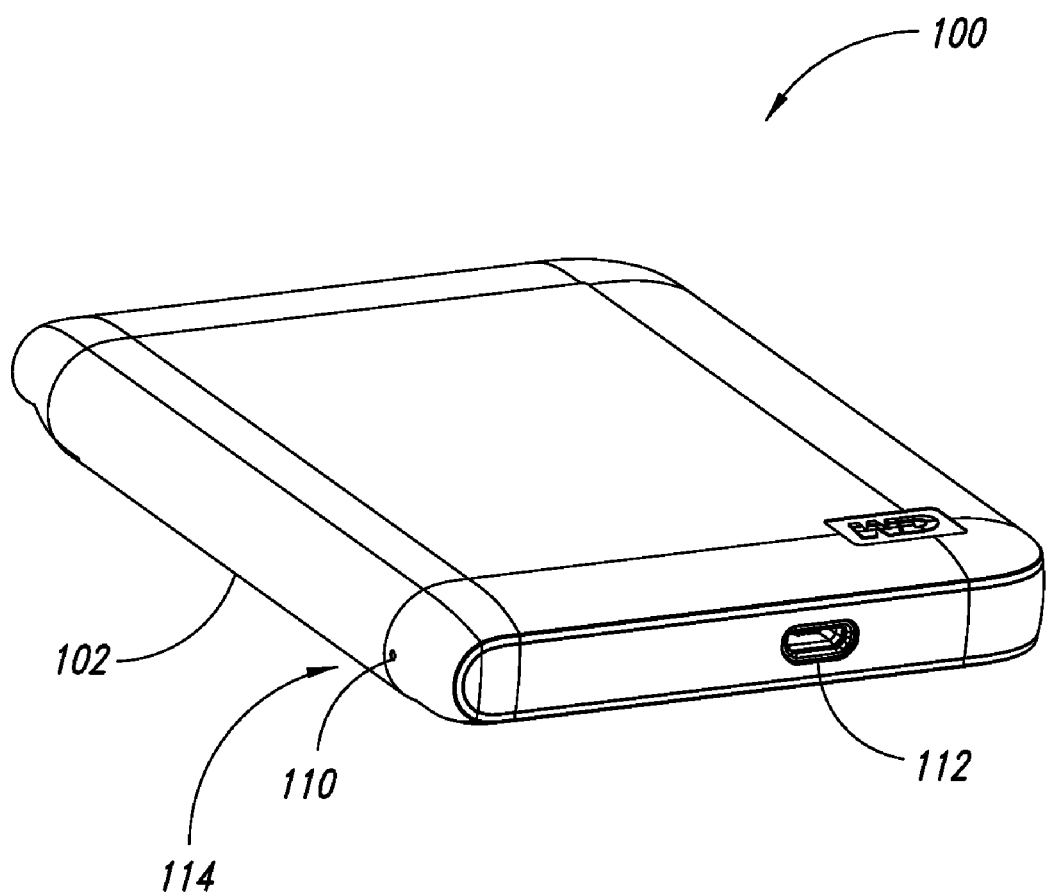
FIG. 1A is a perspective view of an external disk drive, according to one illustrated embodiment.
Figure 1B:
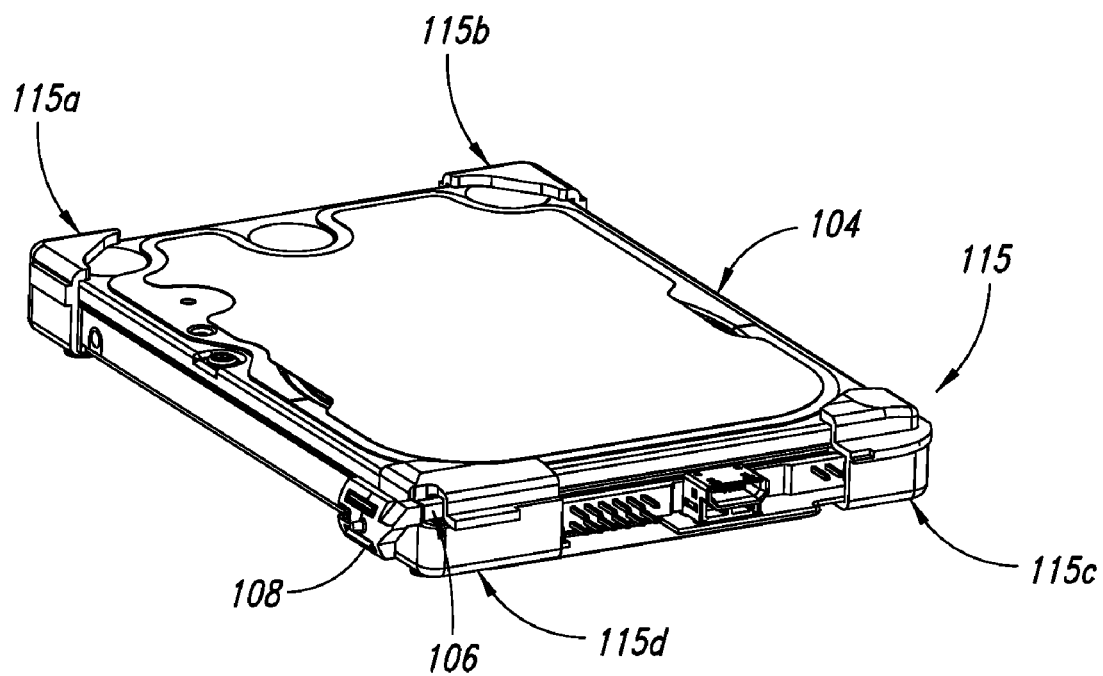
FIG. 1B is a perspective view of the external disk drive of FIG. 1A with an external case removed to show first and second light pipes, according to one illustrated embodiment.
Figure 1C:
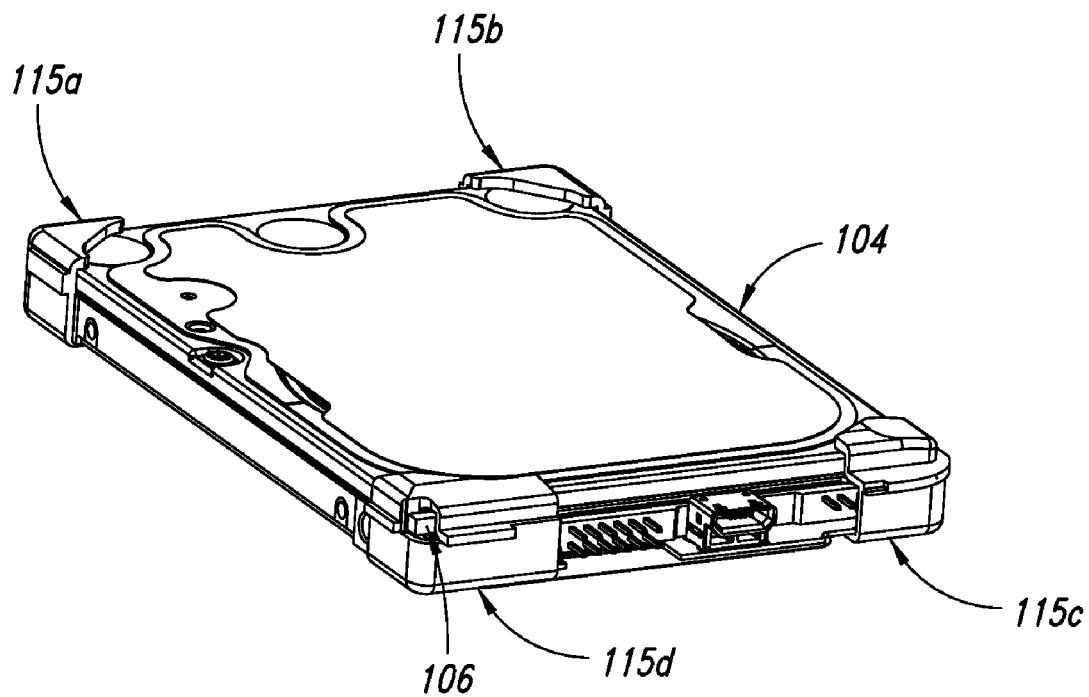
FIG. 1C is a perspective view of the external disk drive of FIG. 1A with the external case and the second light pipe removed, according to one illustrated embodiment.

Referring to FIGS. 1A, 1B and 1C, an external disk drive 100 is illustrated, according to one embodiment. The external disk drive 100 comprises an external case 102 and a disk drive 104 positioned within the external case 102, the disk drive 104 including a light source (see, e.g., the light source 118 in FIG. 5) configured to emit light indicative of a disk drive status. FIGS. 1B and 1C illustrate the external disk drive 100 with the external case 102 removed to better illustrate the disk drive 104 and other components. A first light pipe 106 is mechanically coupled to the disk drive 104 and positioned and configured to directly receive and guide light emitted by the light source. A second light pipe 108 (illustrated in FIG. 1B, but removed in FIG. 1C) is mechanically coupled to the external case 102 and separated from the first light pipe 106. The second light pipe 108 may be positioned and configured to receive and guide light from the first light pipe 106 to a status lens 110 visible outside the external case 102.

The external disk drive 100 may comprise any of a variety of external storage devices configured to communicate with a personal computer. For example, the external disk drive 100 may comprise an external drive having a Universal Serial Bus (USB), FireWire or other serial interface, a networked disk drive providing file server capabilities, a personal media device having an internal disk drive (e.g., an mp3 player), or a cellular phone having an internal disk drive. In addition to the disk drive 104, the external disk drive 100 may include various controllers and/or processors configured to perform computing tasks.

The external case 102 may comprise any of a variety of cases configured to surround and protect the disk drive 104. As illustrated, the external case 102 may be shaped similarly to and tightly enclose the disk drive 104. However, in other embodiments, the external case 102 may have any shape and size and may incorporate a number of other electronic components in addition to the disk drive 104. The external case 102 may also include one or more holes 112 to accommodate interconnections with the disk drive 104 (e.g., to enable communication with and/or powering of the disk drive 104). As illustrated in FIG. 1A, the hole 112 through the external case 102 may be aligned with a USB interface of the disk drive 104, and may be dimensioned to receive a USB connector. The external case 102 may further include a hole 114 configured and dimensioned to receive the status lens 110, thus providing a visible indication of disk drive status to the user.

The external case 102 may comprise any of a variety of materials. In one embodiment, the external case 102 comprises a plurality of molded plastic pieces. The external case 102 may be modular, such that the same molded plastic pieces may be used to form a variety of differently shaped and sized external cases. In another embodiment, the external case 102 may comprise metal, such as stainless steel or aluminum.

The disk drive 104 comprises a magnetic disk drive. However, the structures and methods described herein may also be applied to and/or implemented in other disk drives, including, e.g., optical and magneto-optical disk drives. Indeed, in other embodiments, the disk drive 104 may be replaced by other electronic storage devices (e.g., solid state devices) positioned within an external case.

The disk drive 104 includes a light source (see ,e.g., the light source 118 of FIG. 5) configured to emit light indicative of a disk drive status. The disk drive status may be associated with a variety of different disk drive characteristics. In one embodiment, the disk drive status corresponds to disk drive activity. For example, when the disk drive 104 is accessing data (i.e., reading data from or writing data to a disk), the light source may be configured to emit light. In other embodiments, the disk drive status may correspond to track seeking, external communications, disk drive processor usage, or other disk drive characteristics. In still other embodiments, one or more light sources may be employed, with different colors and/or intensities of light indicative of different disk drive status measures. For example, writing data to a disk and reading data from a disk may be associated with different colors or light intensities.

The light source may comprise any of a variety of light sources and may be positioned in different locations on the disk drive 104. In one embodiment, the light source comprises a light emitting diode (LED), such as a low profile and low power surface mounted LED. In another embodiment, a laser source may be used. The light source may also be driven by a variety of different circuitry in the disk drive 104, depending upon the type of light source and the disk drive status associated with the light source. In one embodiment, a disk drive controller may control the light source based upon disk drive activity.

In one embodiment, the external disk drive 100 further includes a light guide system configured to receive light emitted by the light source, the light guide system comprising a first light pipe 106 and a second light pipe 108 (illustrated in FIG. 1B). The first light pipe 106 may be mechanically coupled to the disk drive 104, and positioned and configured to directly receive and guide light emitted by the light source. The first light pipe 106 may be mechanically coupled to the disk drive 104 in a variety of ways. In one embodiment, the first light pipe 106 may be mechanically coupled to a PCB of the disk drive 104 via a snap fit coupling proximate the light source. For example, the PCB may include one or more holes near the light source, and the first light pipe 106 may include at least one pair of outwardly facing prongs that may be inserted through the holes to fix the first light pipe 106 relative to the PCB. In other embodiments, the first light pipe 106 may be mechanically coupled via a friction fit, adhesives, screws or other structures. In still other embodiments, the first light pipe 106 may be formed integrally with the disk drive 104.

The first light pipe 106 may be positioned to directly receive and guide light emitted by the light source. In one embodiment, a first optical quality surface of the first light pipe 106 is proximate to and faces the light source, and the light entering the first optical quality surface may be guided through the first light pipe 106 to a second optical quality surface where the light may exit the first light pipe 106. The first light pipe 106 may receive and guide only a small percentage of the light emitted by the light source, although, in some embodiments, a substantial majority of the light emitted by the light source enters the first light pipe 106.

The first light pipe 106 may be formed from a variety of materials configured to conduct light therethrough. In one embodiment, the first light pipe 106 may comprise polycarbonate. In another embodiment, the first light pipe 106 may comprise an acrylic material. In other embodiments, the first light pipe 106 may comprise glass, glass fibers or other materials.

The second light pipe 108 may be mechanically coupled to the external case 102 and separated from the first light pipe 106. In one embodiment, the second light pipe 108 is further positioned and configured to receive and guide light from the first light pipe 106 to a status lens 110 visible outside the external case 102. The second light pipe 108 may be mechanically coupled to the external case 102 in a variety of ways. In one embodiment, the second light pipe 108 is ultrasonically welded to the external case 102. In another embodiment, the second light pipe 108 may be adhesively coupled to the external case 102. In yet another embodiment, a friction fit may be formed between the hole 114 through the external case 102 and an elongate portion of the second light pipe 108 defining the status lens 110. In other embodiments, the second light pipe 108 may be mechanically coupled to the external case 102 via a snap fit, a friction fit, screws or other structures. In still other embodiments, the second light pipe 108 may be formed integrally with the external case 102.

The second light pipe 108 may be positioned to receive and guide light from the first light pipe 106 to a status lens 110. In one embodiment, a third optical quality surface of the second light pipe 108 is proximate to and faces the second optical quality surface of the first light pipe 106. The light entering the second light pipe 108 via the third optical quality surface may then be guided to a status lens 110 (which may comprise a separate component or may be integrated with the second light pipe 108). The second light pipe 108 may receive and guide only a small percentage of the light exiting the second optical quality surface, although, in some embodiments, a substantial majority of the light exiting the second optical quality surface enters the second light pipe 108. The status lens 110 simply comprises a surface configured to allow light to pass therethrough, such that a user might view the light. In some embodiments, the status lens 110 may be defined by a surface of the second light pipe 108. In other embodiments, the status lens 110 may be formed separately. For example, the status lens 110 may comprise a surface of a third light pipe (not shown) configured to receive light from the second light pipe 108.

The second light pipe 108 may be formed from a variety of materials designed to conduct light therethrough. In some embodiments, the first and second light pipes 106, 108 may be made from the same materials, although, in other embodiments, different materials may be used. In one embodiment, the second light pipe 108 may comprise polycarbonate. In another embodiment, the second light pipe 108 may comprise an acrylic material. In other embodiments, the second light pipe 108 may comprise glass, glass fibers or other materials.

Although described in the context of an external disk drive 100, the light guide system described herein may also be used with other media storage devices (including, e.g., internal electronic storage devices). In addition, although described as including just two light pipes, other light guide systems may include more than two light pipes in accordance with some embodiments.

As illustrated in FIGS. 1B and 1C, the external disk drive 100 may further include a soft disk drive suspension 115. The soft disk drive suspension 115 includes four corner pieces 115a-d and enables the disk drive 104 to move within a limited range substantially independently of the external case 102. This soft disk drive suspension 115 may help isolate these two components of the external disk drive 100, thus helping to mitigate external shocks to the disk drive 104 as well as to prevent the external case 102 from vibrating based on internal vibrations induced by the rotation of disks or the movement of actuators.

Figure 2:
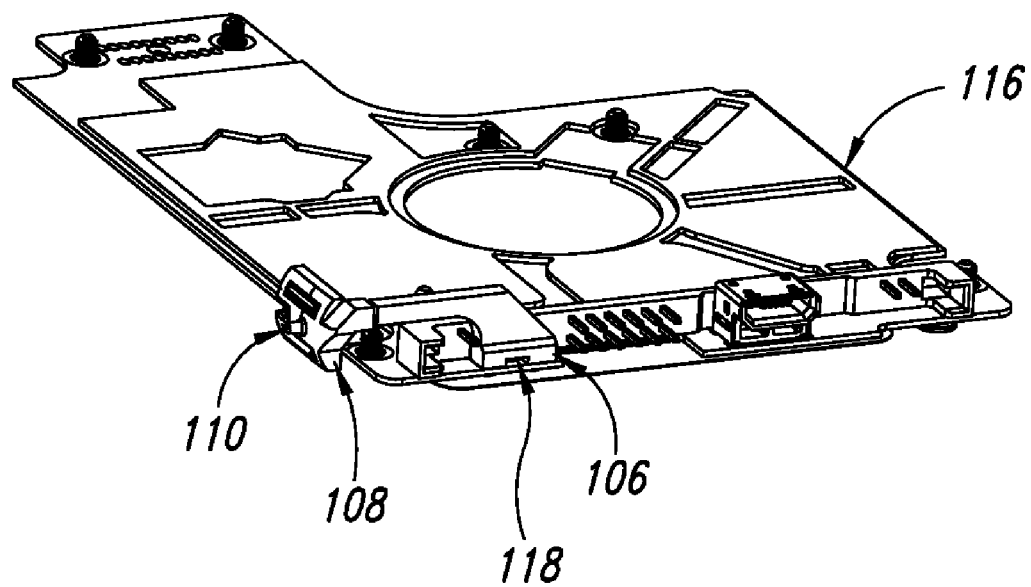
FIG. 2 is a perspective view illustrating a printed circuit board, first light pipe and second light pipe of the external disk drive of FIG. 1A, according to one illustrated embodiment.
Figure 3:
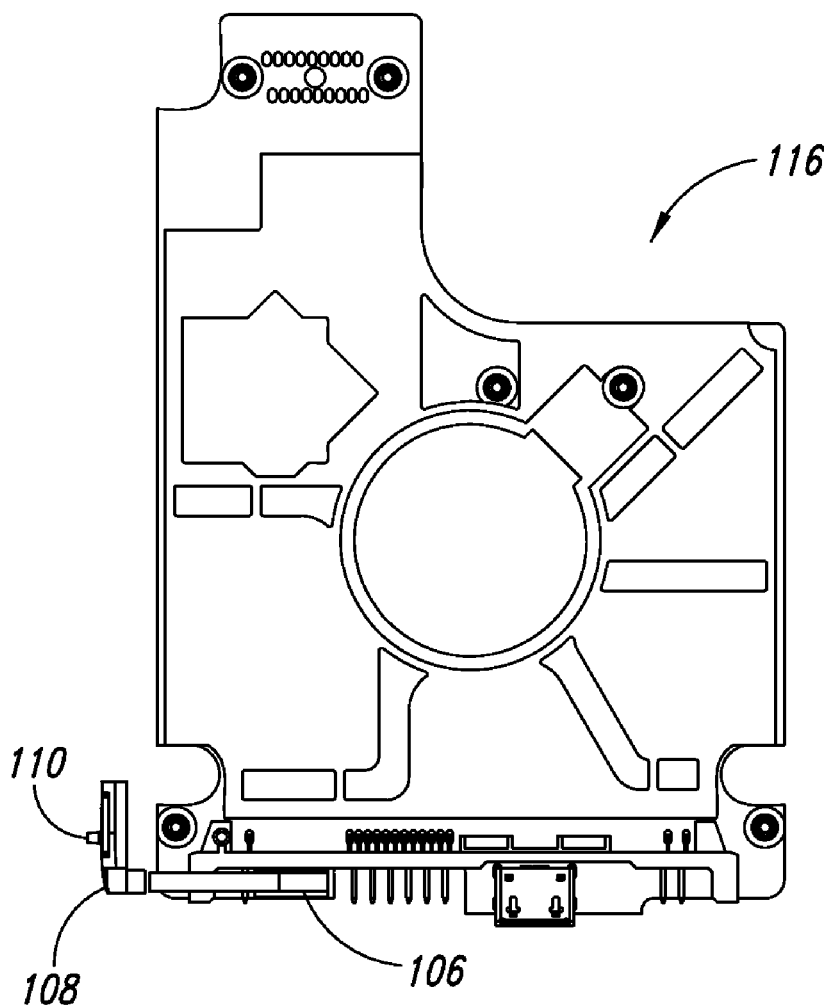
FIG. 3 is a top view illustrating the printed circuit board, the first light pipe and the second light pipe of FIG. 2, according to one illustrated embodiment.

FIGS. 2 and 3 show perspective and top views, respectively, of a printed circuit board (PCB) 116, the first and second light pipes 106, 108 and a light source 118. As illustrated therein, the first light pipe 106 may be mechanically coupled near a "front" of the PCB 116, substantially covering the light source 118. Of course, in different embodiments, the first light pipe 106 may be coupled to the PCB 116 at any of a variety of locations, just as the light source 118 may be positioned at any of a variety of locations. The PCB 116 may also hold a variety of other disk drive circuitry, including a disk drive controller for controlling read and write operations and a servo control system for generating servo control signals.

Figure 4:
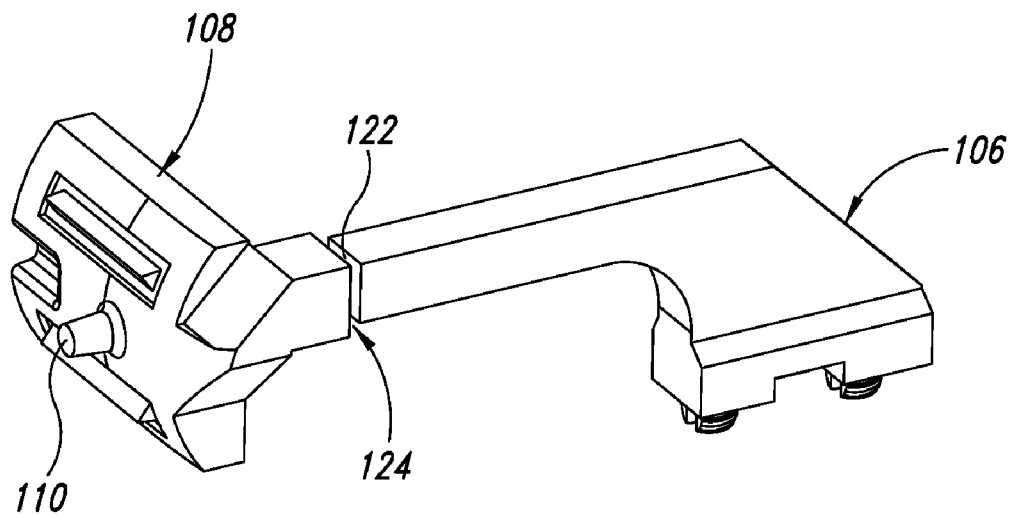
FIG. 4 is a perspective, magnified view of the first light pipe and the second light pipe of the external disk drive of FIG. 1A, according to one illustrated embodiment.
Figure 5:
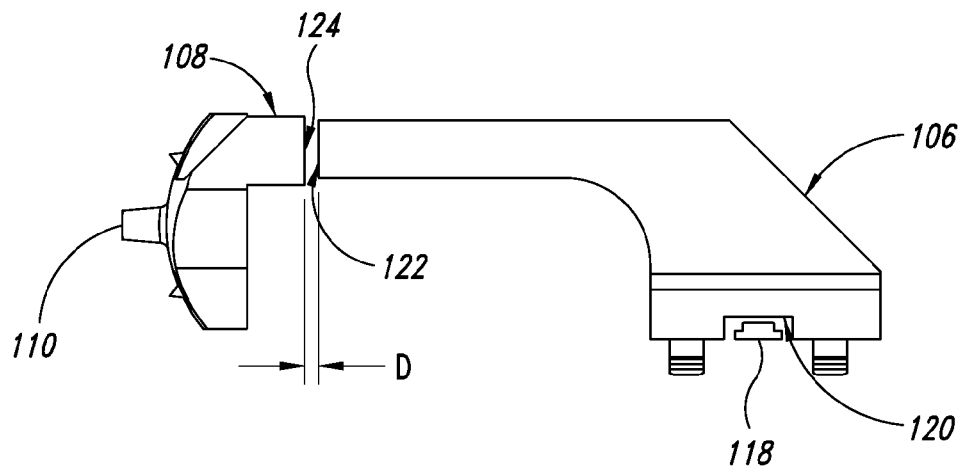
FIG. 5 is a side view of the first light pipe and the second light pipe of FIG. 4 as well as a light source, according to one illustrated embodiment.

FIGS. 4 and 5 show perspective and side magnified views, respectively, of the first light pipe 106, the second light pipe 108, and the light source 118. As is shown in FIGS. 4 and 5, the first light pipe 106 may include a first optical quality surface 120 proximate to and facing the light source 118, and a second optical quality surface 122 proximate to and facing the second light pipe 108. These optical quality surfaces 120, 122 may be polished or otherwise prepared to efficiently receive and/or emit light and to minimize reflectance. In one embodiment, the first optical quality surface 120 comprises a rectangular surface having a larger surface area than that of the rectangular light source 118. In another embodiment, the first optical quality surface 120 may have any of a variety of geometrical shapes and may be larger or smaller than the light source 118. The second optical quality surface 122 may also comprise a rectangular surface, although this surface 122 may also have any of a variety of shapes and sizes.

The first optical quality surface 120 may be separated from the light source 118 by less than 1 mm, in order to improve light transmission between the light source 118 and the first light pipe 106. In some embodiments, the first optical quality surface 120 may be separated from the light source 118 by less than 0.5 mm. In one embodiment, only air may separate the first optical quality surface 120 from the light source 118. However, in other embodiments, other materials may be inserted between these components in order to improve light transmission between the light source 118 and the first light pipe 106.

The second light pipe 108 may include a third optical quality surface 124 proximate to and facing the second optical quality surface 122 (as best shown in FIG. 5). The third optical quality surface 124 may also be polished or otherwise prepared to efficiently receive light and minimize reflectance. In one embodiment, the third optical quality surface 124 may have a surface area greater than a surface area of the second optical quality surface 122. Thus, if the first light pipe 106 moves relative to the second light pipe 108, the third optical quality surface 124 may be dimensioned to continually receive light emitted through the second optical quality surface 122 during such motion. In other embodiments, the third optical quality surface 124 may have any of a variety of geometrical shapes and may be larger or smaller than the second optical quality surface 122.

As best shown in FIG. 5, the first light pipe 106 is separated from the second light pipe 108 by a distance D. In particular, the second optical quality surface 122 and the third optical quality surface 124 are separated by the distance D. In one embodiment, the distance D is less than 1 mm. In another embodiment, the distance D is between 0.25 and 0.75 mm. If the distance D is too great, light transmission between the first and second light pipes 106, 108 may be adversely impacted, but, if the distance D is too small, the first light pipe 106 and the second light pipe 108 have less room to move relative to one another.

In one embodiment, the separation between the first light pipe 106 and the second light pipe 108 enables the first light pipe 106 to move relative to the second light pipe 108. In particular, in one embodiment, the first light pipe 106 may be configured to move within a range of motion substantially independently of the second light pipe 108. As discussed above, in one embodiment, a disk drive suspension 115 may be positioned between the disk drive 104 and the external case 102, such that these components may move relative to one another within some range defined by the range of motion of the disk drive suspension 115. Thus, these small relative movements may be accommodated, in one embodiment, while maintaining a light path between the light source 118 and the status lens 110.

Figure 6:
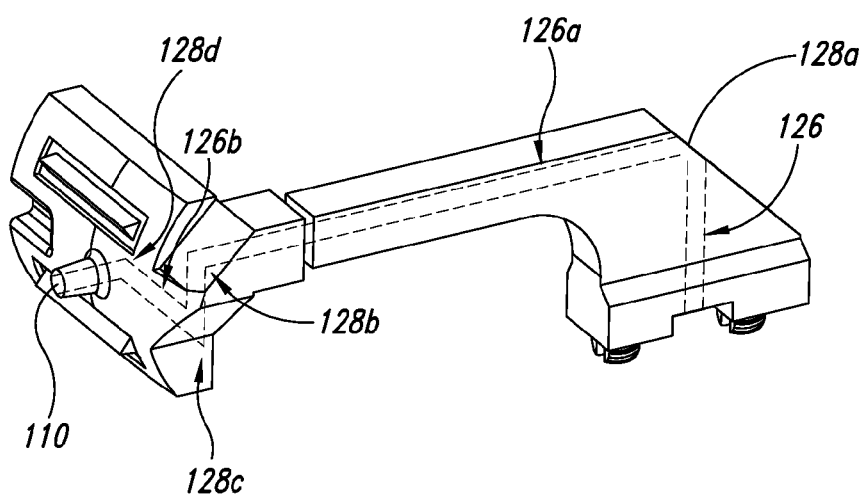
FIG. 6 is an illustration of a light path defined by the first and second light pipes of FIG. 4, according to one illustrated embodiment.
Figure 7A:
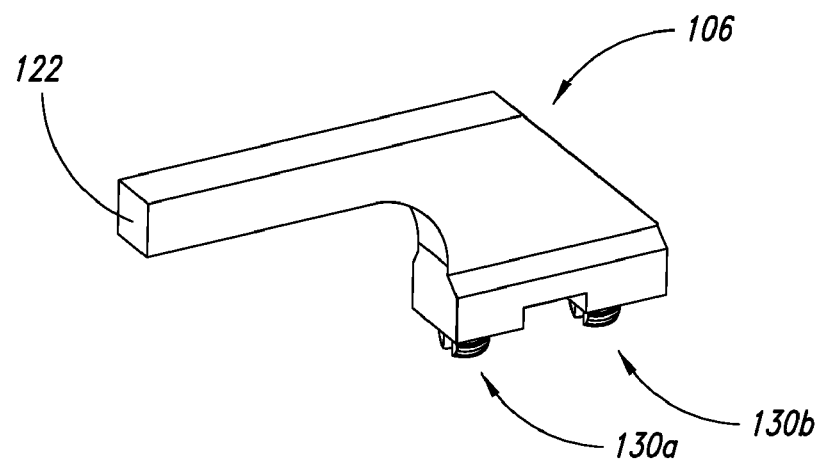
FIG. 7A is a perspective view of the first light pipe of FIG. 4, according to one illustrated embodiment.
Figure 7B:
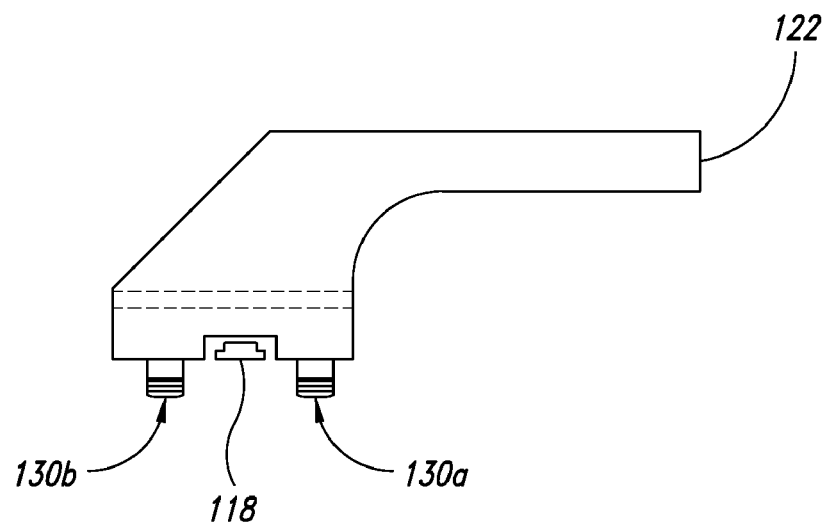
FIG. 7B is a side view of the first light pipe of FIG. 4 as well as a light source, according to one illustrated embodiment.
Figure 7C:
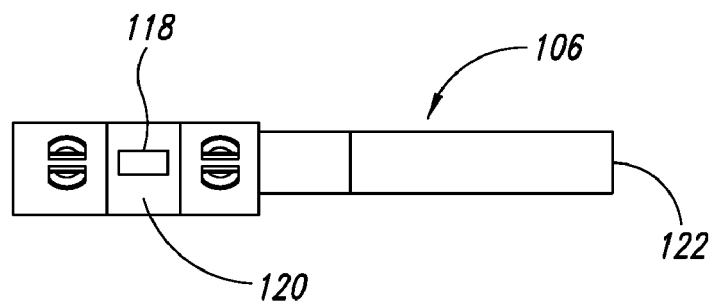
FIG. 7C is a bottom view of the first light pipe and the light source of FIG. 7B, according to one illustrated embodiment.
Figure 7D:
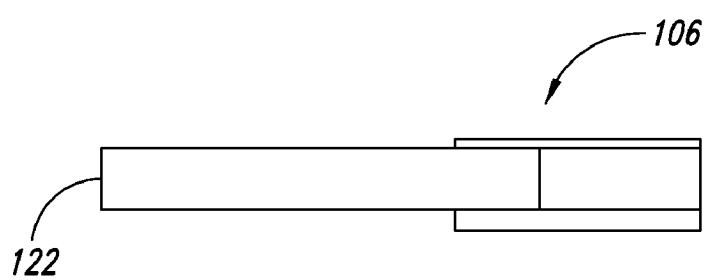
FIG. 7D is a top view of the first light pipe of FIG. 4, according to one illustrated embodiment.
Figure 8E:
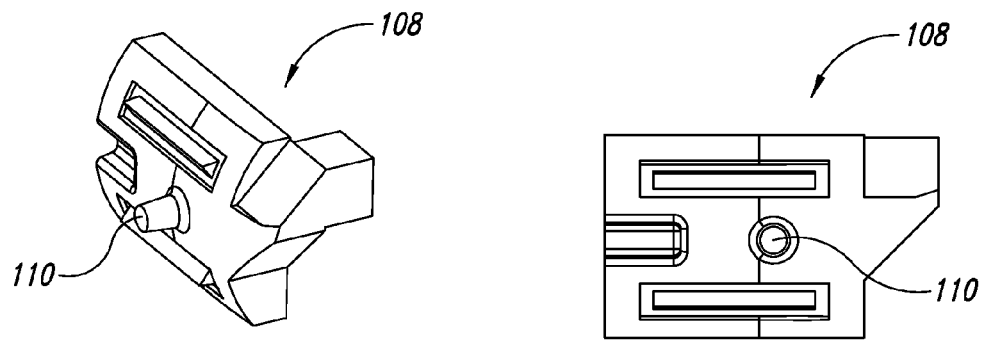
FIG. 8E is a side view of the second light pipe of FIG. 4, according to one illustrated embodiment.
Figure 8E:
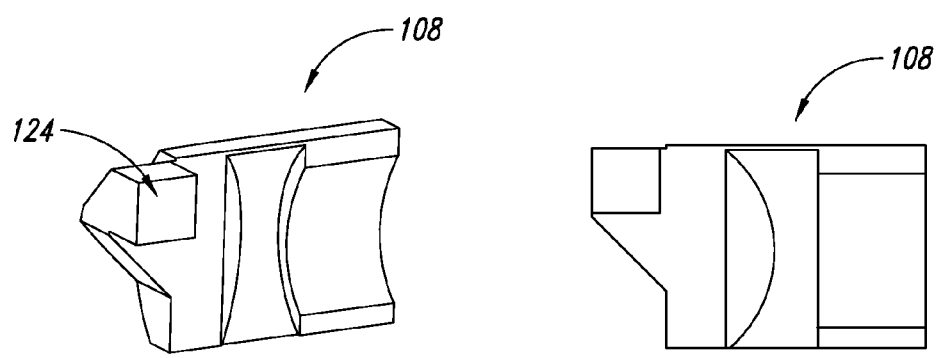
Figure 8E:
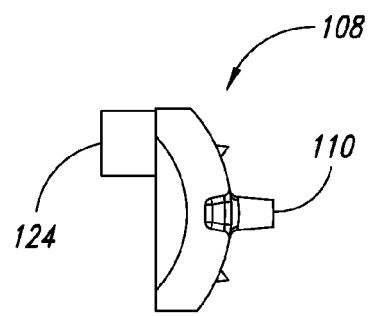

FIG. 6 illustrates a simulated light path 126 for light emitted by the light source 118 that travels through the first light pipe 106 and the second light pipe 108. As illustrated, the light path 126 for this light is defined through the first optical quality surface 120, the second optical quality surface 122 and the third optical quality surface 124. In one embodiment, the light path 126 may be logically divided into a first light path 126a and a second light path 126b defined through the first light pipe 106 and the second light pipe 108, respectively. These light paths 126a, b may together form part of a complete light path 126 for light emitted by the light source 118 to the status lens 110.

The first light path 126a is defined by the first light pipe 106. As illustrated, the first light path 126a may include one 90 degree bend 128a. This 90 degree bend 128a may be defined by an external surface of the first light pipe 106, as illustrated, or may be defined by one or more internal features of the first light pipe 106. The second light path 126b is defined by the second light pipe 108. As illustrated, the second light path 126b may include three 90 degree bends 128b, c, d before the status lens 110. The three 90 degree bends 128b, c, d may be defined by external surfaces of the second light pipe 108, as illustrated, or may be defined by one or more internal features of the second light pipe 108.

Of course, in other embodiments, the light path 126 may include any number of turns/bends along its length between the light source 118 and the status lens 110. These turns/bends may also be divided between the first light pipe 106 and the second light pipe 108 in a variety of ways.

FIGS. 7A-7D illustrate the first light pipe 106 from a variety of angles. In one embodiment, the first light pipe 106 is configured and dimensioned to mechanically couple to the disk drive 104. As illustrated, the first light pipe 106 may include at least one pair of outwardly facing prongs 130a configured to interface with a hole formed through the PCB 116. In one embodiment, the first light pipe 106 includes two pairs of prongs 130a, 130b to provide a secure snap fit coupling between the first light pipe 106 and the PCB 116.

FIGS. 8A-8E illustrate the second light pipe 108 from a variety of angles. The second light pipe 108 may be shaped and configured in a variety of ways, and the external surfaces of the second light pipe 108 may be oriented to define the second light path 126b from the third optical quality surface 124 to the status lens 110.

Figure 9:
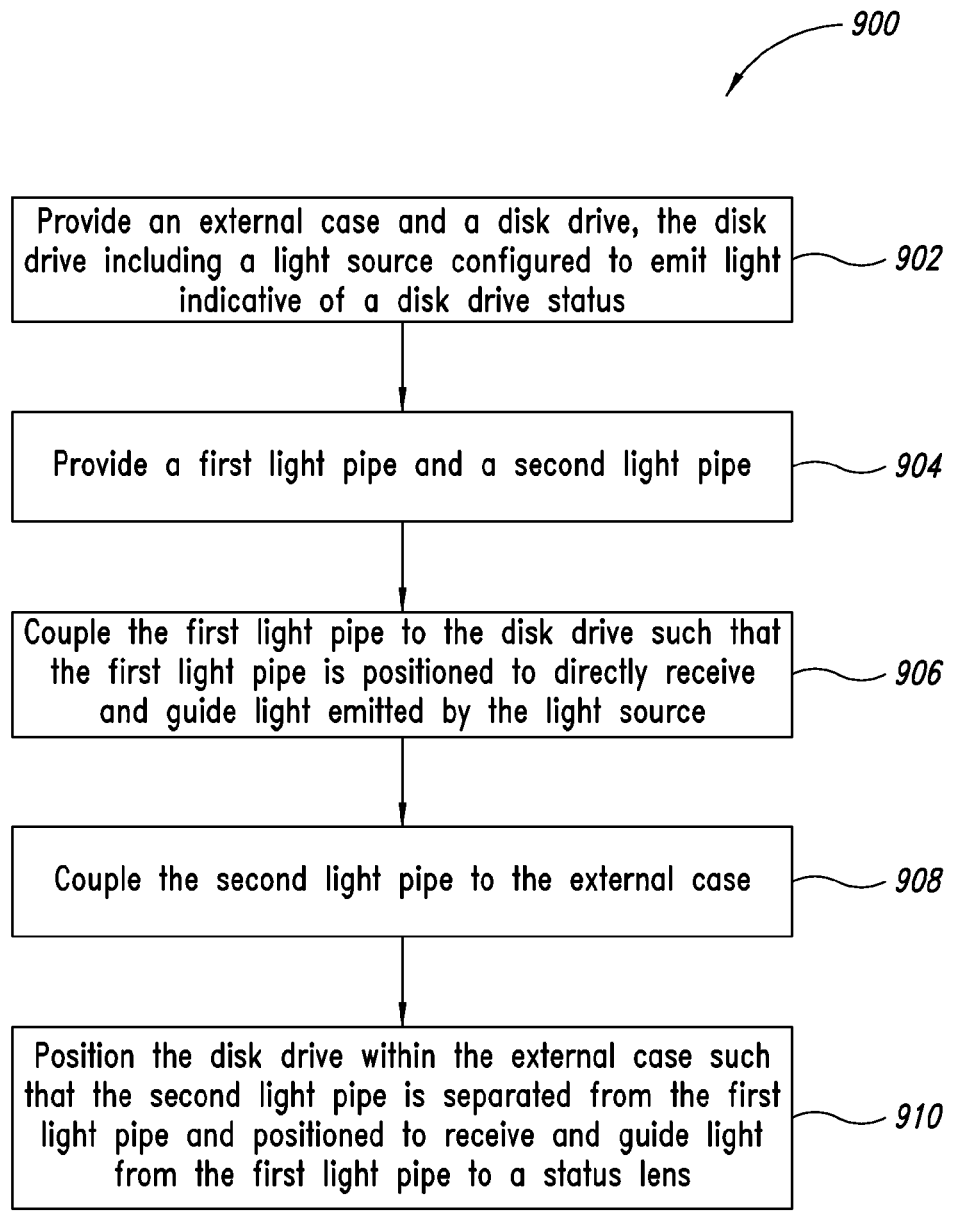
FIG. 9 illustrates a flow chart for a method of manufacturing an external disk drive, according to one illustrated embodiment.

FIG. 9 illustrates a flow chart for a method 900 of manufacturing an external disk drive, according to one illustrated embodiment. This method 900 will be discussed in the context of the external disk drive 100 of FIGS. 1-8. However, the acts disclosed herein may be executed to produce a variety of different external disk drives, in accordance with the described method.

As described herein, at least some of the acts comprising the method 900 may be orchestrated by a processor according to an automatic disk drive manufacturing algorithm, based at least in part on computer-readable instructions stored in computer-readable memory and executable by the processor. A manual implementation of one or more acts of the method 900 may also be employed, in other embodiments.

At act 902, an external case 102 and a disk drive 104 are provided, the disk drive 104 including a light source 118 configured to emit light indicative of a disk drive status. In one embodiment, the external case 102 may be provided as a plurality of modular pieces that may be joined at a later stage to surround the disk drive 104. The disk drive 104, too, may be provided before it has been completely assembled.

At act 904, a first light pipe 106 and a second light pipe 108 are provided. As described above, the first light pipe 106 and the second light pipe 108 may comprise polycarbonate or acrylic pieces. In one embodiment, the first light pipe 106 and the second light pipe 108 may be produced from molds and then provided at an external disk drive assembly line.

At act 906, the first light pipe 106 is coupled to the disk drive 104 such that the first light pipe 106 is positioned to directly receive and guide light emitted by the light source 118. The first light pipe 106 may be coupled to the disk drive 104 in a variety of ways. In one embodiment, as illustrated, a snap fit coupling may be formed between the two components. In other embodiments, other coupling structures may be used.

A robotic arm may be used to couple the first light pipe 106 to the disk drive 104. For example, the first light pipe 106 may be coupled to a printed circuit board 116 using a robotic arm, and the PCB 116 may then be coupled to the rest of the disk drive 104.

At act 908, the second light pipe 108 is coupled to the external case 102. The second light pipe 108 may be coupled to the external case 102 in a variety of ways. In one embodiment, an elongate feature of the second light pipe 108 defining the status lens 110 may be inserted through a hole 114 in the external case 102, and these components may then be ultrasonically welded. In other embodiments, other coupling structures may be used. These coupling structures may connect the second light pipe 108 to the external case 102 at a number of different locations.

At act 910, the disk drive 104 is positioned within the external case 102 such that the second light pipe 108 is separated from the first light pipe 106 and positioned to receive and guide light from the first light pipe 106 to a status lens 110. The disk drive 104 and the external case 102 may be positioned relative to one another in a variety of ways. In one embodiment, the disk drive suspension 115 may first be coupled to the corners of the disk drive 104. The external case 102 may then be positioned around and mechanically coupled to the disk drive suspension 115, such that the disk drive 104 is positioned within the external case 102. In other embodiments, the external case 102 may remain fixed, while the disk drive 104 is placed into an interior of the external case 102.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

I claim:

1. An external disk drive comprising:
   an external case;
   a disk drive positioned within the external case, the disk drive including a light source configured to emit light indicative of a disk drive status;
   a first light pipe mechanically coupled to the disk drive and positioned and configured to directly receive and guide light emitted by the light source; and
   a second light pipe mechanically coupled to the external case and separated from the first light pipe, the second light pipe positioned and configured to receive and guide light from the first light pipe to a status lens visible outside the external case.

2. The external disk drive of claim 1, wherein the disk drive includes a printed circuit board, and the first light pipe is mechanically coupled to the printed circuit board via a snap fit coupling proximate the light source.

3. The external disk drive of claim 1, wherein the disk drive includes a printed circuit board, and the light source comprises a light emitting diode on the printed circuit board.

4. The external disk drive of claim 1, wherein the disk drive status represents disk drive activity.

5. The external disk drive of claim 1, wherein the first light pipe includes a first optical quality surface proximate to and facing the light source, and a second optical quality surface proximate to and facing the second light pipe.

6. The external disk drive of claim 5, wherein the second light pipe includes a third optical quality surface proximate to and facing the second optical quality surface.

7. The external disk drive of claim 6, wherein a light path for light emitted by the light source is defined through the first optical quality surface, the second optical quality surface and the third optical quality surface.

8. The external disk drive of claim 6, wherein the second optical quality surface and the third optical quality surface are separated by between 0.25 and 0.75 mm.

9. The external disk drive of claim 6, wherein the third optical quality surface has a third surface area greater than a second surface area of the second optical quality surface.

10. The external disk drive of claim 1, wherein the first light pipe defines a first light path for light emitted by the light source, the first light path including a 90 degree bend, and the second light pipe defines a second light path for light from the first light pipe, the second light path including three 90 degree bends before the status lens.

11. The external disk drive of claim 10, wherein the first light path and the second light path form part of a complete light path for light emitted by the light source to the status lens.

12. The external disk drive of claim 1, wherein the first light pipe and the second light pipe comprise polycarbonate.

13. The external disk drive of claim 1, wherein the second light pipe is formed integrally with the status lens.

14. The external disk drive of claim 1, wherein the first light pipe is configured to move within a range of motion substantially independently from the second light pipe.

15. A disk drive status light guide system for a disk drive, the disk drive including a light source configured to emit light indicative of a disk drive status, the light guide system comprising:

a first light pipe configured and dimensioned to mechanically couple to the disk drive and configured to directly receive and guide light emitted by the light source; and a second light pipe separate from the first light pipe, the second light pipe configured to receive and guide light from the first light pipe to a status lens visible to a user.

16. The light guide system of claim 15, wherein the first light pipe is configured and dimensioned to mechanically couple to a printed circuit board of the disk drive via a snap fit coupling proximate the light source.

17. The light guide system of claim 15, wherein the first light pipe includes a first optical quality surface configured and dimensioned to be brought proximate to and face the light source, and a second optical quality surface configured and dimensioned to be brought proximate to and face the second light pipe.

18. The light guide system of claim 17, wherein the second light pipe includes a third optical quality surface configured and dimensioned to be brought proximate to and face the second optical quality surface, the third optical quality surface having a third surface area greater than a second surface area of the second optical quality surface.

19. The light guide system of claim 15, wherein the first light pipe defines a first light path for light emitted by the light source, the first light path including a 90 degree bend, and the second light pipe defines a second light path for light from the first light pipe, the second light path including three 90 degree bends before the status lens.

20. The light guide system of claim 15, wherein the first light pipe and the second light pipe comprise polycarbonate.

21. The light guide system of claim 15, wherein the second light pipe is formed integrally with the status lens.

22. A method of manufacturing an external disk drive, the method comprising:

providing an external case and a disk drive, the disk drive including a light source configured to emit light indicative of a disk drive status;

providing a first light pipe and a second light pipe;

coupling the first light pipe to the disk drive such that the first light pipe is positioned to directly receive and guide light emitted by the light source;

coupling the second light pipe to the external case; and positioning the disk drive within the external case such that the second light pipe is separated from the first light pipe and positioned to receive and guide light from the first light pipe to a status lens.

23. The method of claim 22, wherein the disk drive includes a printed circuit board, and coupling the first light pipe to the disk drive includes coupling the first light pipe to the printed circuit board via a snap fit coupling proximate the light source.

24. The method of claim 22, wherein the disk drive includes a printed circuit board, and the light source comprises a light emitting diode on the printed circuit board.

25. The method of claim 22, wherein the disk drive status represents disk drive activity.

26. The method of claim 22, wherein the first light pipe includes a first optical quality surface and a second optical quality surface, and wherein coupling the first light pipe to the disk drive includes coupling the first light pipe to the disk drive such that the first light pipe is proximate to and faces the light source, and positioning the disk drive within the external case includes positioning the disk drive such that the second optical quality surface is proximate to and faces the second light pipe.

27. The method of claim 26, wherein the second light pipe includes a third optical quality surface, and wherein positioning the disk drive within the external case includes positioning the disk drive such that the third optical quality surface is proximate to and faces the second optical quality surface.

28. The method of claim 27, wherein positioning the disk drive within the external case includes positioning the disk drive such that a light path for light emitted by the light source is defined through the first optical quality surface, the second optical quality surface and the third optical quality surface.

29. The method of claim 27, wherein positioning the disk drive within the external case includes positioning the disk drive such that the second optical quality surface and the third optical quality surface are separated by between 0.25 and 0.75 mm.

30. The method of claim 27, wherein the third optical quality surface has a third surface area greater than a second surface area of the second optical quality surface.

31. The method of claim 22, wherein the first light pipe defines a first light path for light emitted by the light source, the first light path including a 90 degree bend, and the second light pipe defines a second light path for light from the first light pipe, the second light path including three 90 degree bends before the status lens.

32. The method of claim 31, wherein positioning the disk drive within the external case includes positioning the disk drive such that the first light path and the second light path form part of a complete light path for light emitted by the light source to the status lens.

33. The method of claim 22, wherein the first light pipe and the second light pipe comprise polycarbonate.

34. The method of claim 22, wherein the second light pipe is formed integrally with the status lens.

35. The method of claim 22, wherein positioning the disk drive within the external case includes positioning the disk drive such that the first light pipe is configured to move within a range of motion substantially independently from the second light pipe.

36. A light guide system for an electronic storage device, the electronic storage device including a light source configured to emit light indicative of a storage device status, the light guide system comprising:

a first light pipe configured and dimensioned to mechanically couple to the electronic storage device and configured to directly receive and guide light emitted by the light source; and a second light pipe separate from the first light pipe, the second light pipe configured to receive and guide light from the first light pipe to a status lens visible to a user.

* * * * *